US010652590B2

(12) United States Patent
Barnich et al.

(10) Patent No.: US 10,652,590 B2
(45) Date of Patent: May 12, 2020

(54) MODULAR SOFTWARE BASED VIDEO PRODUCTION SERVER, METHOD FOR OPERATING THE VIDEO PRODUCTION SERVER AND DISTRIBUTED VIDEO PRODUCTION SYSTEM

(71) Applicant: EVS Broadcast Equipment SA, Seraing (BE)

(72) Inventors: Olivier Barnich, Liège (BE); Michael Bastings, Saint Nicolas (BE); Johan Vounckx, Linden (BE)

(73) Assignee: EVS BROADCAST EQUIPMENT SA, Seraing (BE)

( * ) Notice: Subject to any disclaimer, the term of this patent is extended or adjusted under 35 U.S.C. 154(b) by 0 days.

(21) Appl. No.: 16/092,073

(22) PCT Filed: Apr. 3, 2017

(86) PCT No.: PCT/EP2017/057831
§ 371 (c)(1),
(2) Date: Oct. 8, 2018

(87) PCT Pub. No.: WO2017/178263
PCT Pub. Date: Oct. 19, 2017

(65) Prior Publication Data
US 2019/0166386 A1 May 30, 2019

(30) Foreign Application Priority Data
Apr. 12, 2016 (EP) .................................... 16164809

(51) Int. Cl.
H04N 21/231 (2011.01)
G11B 27/034 (2006.01)
(Continued)

(52) U.S. Cl.
CPC ......... H04N 21/231 (2013.01); G11B 27/034 (2013.01); H04N 21/21 (2013.01);
(Continued)

(58) Field of Classification Search
CPC .... H04N 21/231; H04N 21/21; H04N 21/222; H04N 21/23; G11B 27/034
See application file for complete search history.

(56) References Cited

U.S. PATENT DOCUMENTS

2002/0109710 A1    8/2002  Holtz et al.
2009/0089128 A1*  4/2009  Tkatch .................. G06Q 10/06
                                                            719/330
(Continued)

FOREIGN PATENT DOCUMENTS

EP    2439650 A2 *  4/2012  ........... G11B 27/032
EP    2439650 A2    4/2012
(Continued)

OTHER PUBLICATIONS

Sven Meier et al: "IEEE 1588 applied in the environment of high availability LANs". Information Sciences and Systems. 2007. CISS '07. 41st Annual Con Ference On. IEEE. PI. Oct. 1, 2007 (Oct. 1, 2007). pp. 100-104. XP031161286.
(Continued)

Primary Examiner — Sumaiya A Chowdhury
(74) Attorney, Agent, or Firm — Meagher Emanuel Laks Goldberg & Liao, LLP

(57) ABSTRACT

A video production server comprising at least one processor and a storage is suggested. Software modules composed of executable program code are loaded into a working memory of the at least one processor. Each software module, when executed by the at least one processor, provides an elementary service. A concatenation of elementary services provides for a functionality involving processing of video
(Continued)

and/or audio signals needed for producing a broadcast program. The video production server includes a set of software components that runs on conventional hardware. Each functionality of the video production server is achieved by using a specific piece of software that is assembled from reusable functional software blocks and that can run on any compatible hardware platform. Furthermore, a method for operating the video production server and a distributed video production system including the video production server is suggested.

19 Claims, 13 Drawing Sheets

(51) Int. Cl.
| | | |
|---|---|---|
| H04N 21/23 | (2011.01) | |
| H04N 21/21 | (2011.01) | |
| H04N 21/222 | (2011.01) | |
| H04N 21/8547 | (2011.01) | |
| H04N 21/234 | (2011.01) | |
| H04N 21/235 | (2011.01) | |
| H04N 21/24 | (2011.01) | |
| H04N 21/43 | (2011.01) | |
| H04N 21/242 | (2011.01) | |
| H04N 21/85 | (2011.01) | |
| H04N 5/222 | (2006.01) | |
| G11B 27/34 | (2006.01) | |
| G11B 27/30 | (2006.01) | |
| G06F 9/38 | (2018.01) | |

(52) U.S. Cl.
CPC ......... *H04N 21/222* (2013.01); *H04N 21/23* (2013.01); *H04N 21/234* (2013.01); *H04N 21/235* (2013.01); *H04N 21/242* (2013.01); *H04N 21/2405* (2013.01); *H04N 21/43* (2013.01); *H04N 21/8547* (2013.01); *G06F 9/38* (2013.01); *G11B 27/3036* (2013.01); *G11B 27/34* (2013.01); *H04N 5/222* (2013.01); *H04N 21/85* (2013.01)

(56) References Cited

U.S. PATENT DOCUMENTS

| | | | |
|---|---|---|---|
| 2009/0187826 A1 | 7/2009 | Heimbold et al. | |
| 2010/0135334 A1* | 6/2010 | Briscoe | H04J 3/0664 370/503 |
| 2010/0199322 A1* | 8/2010 | Bennett | H04N 21/2368 725/114 |
| 2012/0030319 A1* | 2/2012 | Andries | H04L 41/5009 709/220 |
| 2013/0070047 A1* | 3/2013 | DiGiovanni | H04N 5/222 348/36 |
| 2013/0272374 A1 | 10/2013 | Eswaran et al. | |

FOREIGN PATENT DOCUMENTS

| | | | | |
|---|---|---|---|---|
| WO | 2008022305 A2 | 2/2008 | | |
| WO | WO-2008022305 A2 * | 2/2008 | ............. | H04N 5/222 |

OTHER PUBLICATIONS

International Search Report for PCT/EP2017/057831 dated May 10, 2017.
Written Opinion for PCT/EP2017/057831 dated May 10, 2017.
Boutaba R et al: "Distributed Video Production: Tasks. Architecture and QoS Provisioning" Multimedia Tools and Applications. Kluwer Academic Publishers. Boston. US. vol. 16. No. 1-2, Jan. 1, 2002 (Jan. 1, 2002). pp. 99-136.
Nabor C. Mendonca et al: "An Approach for Recovering Distributed System Architectures", Automated Software Engineering, vol. 8. No. 3/4, Aug. 1, 2001 (Aug. 1, 2001). pp. 311-354.
Anup Das et al: "Energy-aware task mapping and scheduling for reliable embedded computing systems", ACM Transactions on Embedded Computing Systems, ACM, New York, NY, US, vol. 13. No. 2s, Jan. 27, 2014 (Jan. 27, 2014), pp. 1-27.
European Office Action issued in corresponding EP 17714245.2 dated Aug. 16, 2019.

* cited by examiner

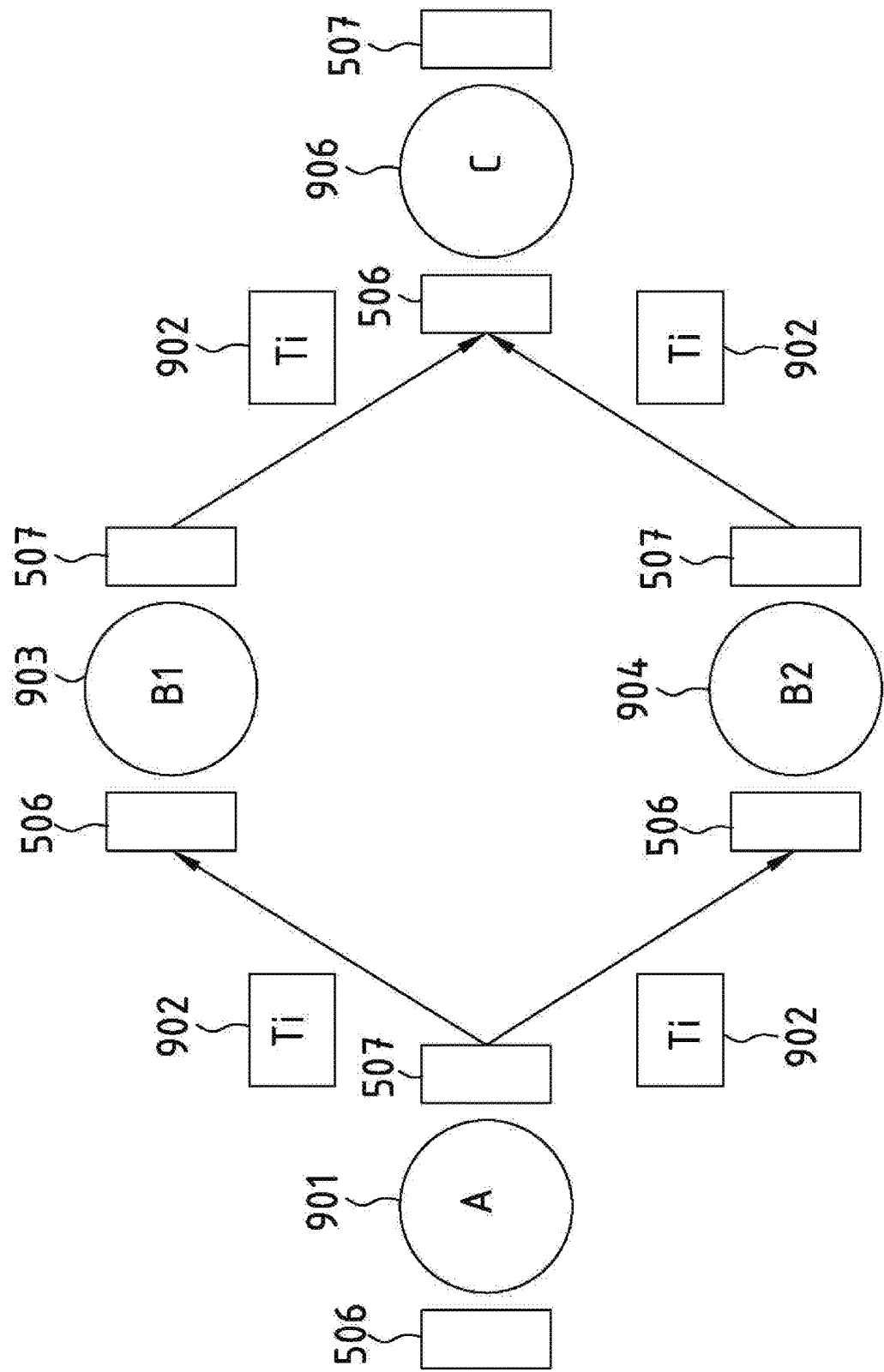

MODULAR SOFTWARE BASED VIDEO PRODUCTION SERVER, METHOD FOR OPERATING THE VIDEO PRODUCTION SERVER AND DISTRIBUTED VIDEO PRODUCTION SYSTEM

TECHNICAL FIELD

The disclosure is related to a software-based video production server, a method for operating the video production server and a distributed video production system. The video production server supports various kinds of functionalities that are needed for a broadcast production.

BACKGROUND

For a live TV production in today's video production environment very expensive specialized equipment is used for the acquisition, processing, and play out of video and/or audio feeds or streams coming from acquisition devices, such as cameras and microphones. Sometimes the video and/or audio feeds are combined with associated meta-data, for instance video/audio meta-data or meta-data associated with the event that is captured, such as the speed of athletes or situational data being supplied by experts, e.g. commentaries on sports games like goals, fouls, etc. All the incoming signals or data need to be processed to produce one or more final program output signal(s). A processing unit that is part of the production equipment performs the processing of the signals. The processing includes ingesting signals from acquisition devices into processing equipment;
encoding raw signals from the acquisition devices into lower bit rate signals;
deriving lower resolution copies of the original signal, e.g. for monitoring or other purposes;
decoding the lower bit rate signals into the original raw signal;
transcoding signals;
recording a signal for later use;
applying video effects to signals;
mixing different signals into a single signal;
playing out of signals;
displaying signals.

A big portion of the necessary processing is performed by vision mixers and production servers. Vision mixers are available, e.g. from companies like EVS, Grass Valley, Sony, SAM, and Ross. In a typical broadcast production vision mixers and production servers are connected with other devices such as cameras, video stores, video effect generators, and others. All these devices are commercially available. Today all these devices are built from specialized hardware components. Of course, audio signals accompanying the video signals likewise need to be processed during a broadcast production.

Dedicated appliances run on these specialized hardware devices for performing specific functions mentioned above. The probability of using all the dedicated devices and their full power at the same time is very low. This leads to a overprovisioning of processing power. At the same time this also causes very little flexibility of the processing infrastructure in a conventional broadcast studio because different types of productions, e.g. live sports versus live news, cannot be made on the same infrastructure unless all necessary devices for both types of productions are available.

There is yet another reason contributing to the inefficiency of conventional broadcast studios. In a conventional broadcast environment, most of the communication between the broadcast equipment devices is achieved through baseband transmission of video/audio signals using the proprietary SDI format. The devices operate synchronously, according to a shared timing signal (called Genlock or black-burst) that is routed together with the SDI signals. This timing signal is typically a squared signal whose rising edges correspond to the arrival of new video frames in the system. As a result, video/audio frames must be processed internally within a fixed time interval, leading to a worst-case dimensioning of the infrastructure, because all processing steps must be finalized before the next frame arrives. Typical hardware systems require an even finer level of synchronization down to a line level and even a sub-line level.

US 2009/0187826 A1 describes a data control and display system which controls all production devices in a video production system. The production devices are conventional but the control system consolidates the functionalities of the connected production devices. The control system simplifies the operation of the video production system.

A more recent concept for broadcast productions is distributed video production. It attempts to overcome at least some of the limitations of conventional broadcast equipment. The concept of distributed video production is described, for example, in the article of Boutaba et al.: "Distributed Video Production: Tasks, Architecture and QoS Provisioning", published in Multimedia Tools and Applications, Kluwer Academic Publishers, Boston, US, Volume 16, Number 1-2, 1 Jan. 2002, pages 99 to 136. Boutaba et al. address the issue of delay, delay variations and inter-media skew requirements. Boutaba et al. explicitly state that delay performance is measured based on delay variation or "jitter". Jitter is a measure of the difference in delay experienced by different packets in a network due to variation in buffer occupancy in intermediate switching nodes. Another form of jitter is inter-stream jitter or "skew", which measures the difference in delay as seen by separate streams pertaining to the same application (such as audio and video). In order to ensure proper intra-stream synchronization, low delay variation is often required. Boutaba et al. suggest compensating jitter by buffering the data streams. This requires the provision of sufficient memory capable of storing sufficiently long intervals of the video and audio data to compensate the jitter. In the case of high definition video data this requires a big storage capacity.

Boutaba et al. rely on different kinds of servers to realize different functionalities that are needed for a broadcast production. For each functionality a specific type of server is used. Each specific server is either built exclusively with proprietary hardware, or with standard hardware and proprietary acceleration boards.

Taking this as a starting point, the present disclosure suggests a software based video production server providing enhanced flexibility for broadcast productions.

SUMMARY

According to a first aspect the present disclosure suggests a video production server comprising at least one processor and a storage. Software modules composed of executable program code are loaded into a working memory of the at least one processor. Each software module, when executed by the at least one processor, provides an elementary service. A concatenation of elementary services provides a functionality involving processing of video and/or audio signals needed for producing a broadcast program.

According to an embodiment of the video production server the software modules are mapped on the hardware of the video production server.

In one advantageous embodiment the video production server is configured as an ingest server ingesting signals, including video and/or audio signals as streams of data frames from acquisition devices in synchronicity with the output of acquisition devices.

According to an embodiment the ingest server is adapted for ingesting simultaneously multiple signal streams of different formats.

If the video production server is configured as an ingest server it is equipped with an ingest module assigning time stamps to each incoming data frame.

In another embodiment the video production server is configured as a play out server outputting video and/or audio signals as data frames in synchronicity with downstream devices receiving the output signals of the video production server. The acquisition devices and the downstream devices do not need to have the same synchronicity.

Advantageously, the at least one processor of the video production server performs asynchronous internal processing of the video and/or audio signals.

In an advantageous embodiment the at least one processor is configured to process the data frames in the sequence of their time stamps assigned by the ingest modules.

Advantageously, each software module of the video production server has defined data interfaces (API) describing a unitary data format for the video, audio data, meta-data and/or control data at the input and output of the software modules enabling a user defined sequence of elementary services. In this case the user defined sequence of elementary services forms at least one processing pipeline for the video and/or audio signals and/or meta-data.

In an advantageous embodiment an elementary service can be removed from, replaced in or inserted into the at least one processing pipeline without affecting the operation of the remainder of the processing pipeline.

In one embodiment the video production server executes an algorithm which detects hardware failures and automatically re-maps the software modules such that the software modules are no longer mapped on the failed hardware.

In a further embodiment the video production server includes a storage enabling direct access to any grain after the grain has been stored, wherein "grain" is a general term for the smallest element processed in the video production server. For instance, a grain is a video or an audio frame.

In yet another embodiment the video production server comprises multiple server nodes being communicatively connected by a network. According to a development of this embodiment the software modules are dynamically mapped on the multiple server nodes for performance enhancement of the at least one processing pipeline composed of elementary services provided by the software modules.

According to a second aspect the present disclosure suggests a distributed video production system comprising at least two broadcast production devices, which are interconnected by a network and which are synchronized with each other. At least one of the broadcast production devices is a video production server according to the present disclosure.

According to a third aspect the present disclosure suggests a method for operating this video production server, wherein the method comprises:
defining a sequence of elementary services being applied to data frames of received signal streams such as video and audio streams;
processing data frames according to the defined sequence of elementary services in an asynchronous manner, while
maintaining the temporal relationship of time stamped data frames of associated video and/or audio streams.

In a further embodiment the method further comprises:
Dynamically changing the sequence of elementary services from one data frame to the next data frame of a received signal stream by removing an elementary service from, replacing an elementary service in or inserting an elementary service into the sequence of elementary services.

In another embodiment the method further comprises:
dynamically mapping the software modules on the hardware platform composed of multiple server nodes for performance enhancement of the sequence of elementary services.

According to a development of this embodiment the dynamical mapping changes from one data frame to the next data frame of a received signal stream.

According to a final aspect the present disclosure suggests a software containing program code, which, when executed by a processor, performs a method according to the third aspect of the present disclosure.

BRIEF DESCRIPTION OF DRAWINGS

In the drawings exemplary embodiments of the present disclosure are shown. The same or similar elements in the figures are indicated with the same or similar reference numbers. It shows:

FIGS. 9A and 9B pipelines of elementary services which are fault tolerant;

DESCRIPTION OF EMBODIMENTS

Figure 1:
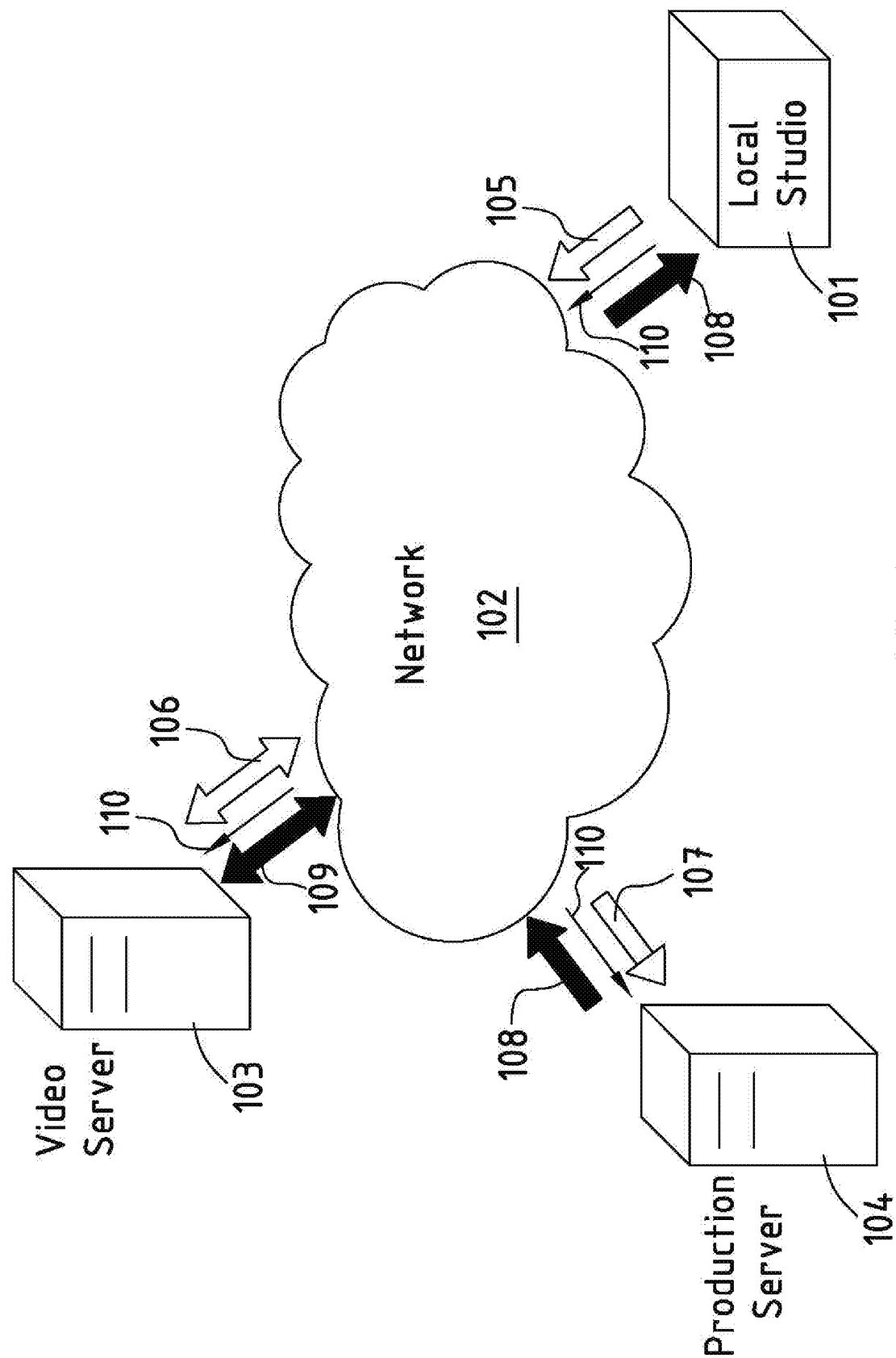
FIG. 1 a schematic structure of a distributed broadcast production system.

Reference herein to "one embodiment" or "an embodiment" means that a particular feature, structure, or characteristic described in connection with the embodiment can be included in at least one implementation of the present solution. The appearances of the phrase "in one embodiment" in various places in the specification are not necessarily all referring to the same embodiment, nor are separate or alternative embodiments necessarily mutually exclusive of other embodiments.

While the present solution may be susceptible to various modifications and alternative forms, specific embodiments have been shown by way of example in the drawings and will be described in detail herein. However, it should be understood that the present solution is not intended to be limited to the particular forms disclosed.

One or more specific embodiments of the present solution will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Certain aspects commensurate in scope with the disclosed embodiments are set forth below. It should be understood that these aspects are presented merely to provide the reader with a brief summary of certain forms the solution might take and that these aspects are not intended to limit its scope. Indeed, the present solution may encompass a variety of aspects that may not be set forth below.

FIG. 1 is a schematic illustration of the architecture of a distributed video production (DVP) system. Producers and editors work in a local studio 101 where they create a draft model of a broadcast program. Some studios are equipped with all necessary high quality broadcast devices that are needed to produce even complex broadcast programs. In contrast, the local studio 101 in FIG. 1 is connected via a high-speed broadcast network 102 with only two video production servers, namely a video server 103 and a production server 104. The labels "video server" and "production server" point to the tasks in the set-up shown in FIG. 1. In the following the term "video production server" is used as a generic term for servers performing different tasks in a video production system. Video server 103 stores a database of footages as video streams that are available for the producer. The production server 104 enables various functionalities like cutting, wiping, fading, keying etc. for composing the program output stream according to the creative concept of the producer. In the local studio 101 there are also cameras and microphones (not shown in FIG. 1) generating video and audio data, e.g. from a moderator performing an interview with a studio guest. In case of a pre-produced program these streams are sent from the local studio 101 to the video server 103. This is symbolized in FIG. 1 by arrows 105 and 106. In case of a live program the video stream produced in the local studio 101 is sent directly to the production server 104 (arrows 105, 107) to be included in an edited program stream 108 outputted by the production server 104. The program stream 108 is transferred via the network 102 back to the local studio 101 for monitoring by the producer and for being broadcasted. The edited program stream 108 normally includes also video streams stored on the video server 103, which sends them (arrow 109) via the network 102 to the production server 104. The producer controls the operation of the video server 103 and the production server 104 by sending command signals 110 from the local studio 101.

In the exemplary system shown in FIG. 1 there are only two servers 103, 104. But other systems may comprise only one or more than two server(s) depending on what kind of functionalities are needed by the producer to realize the program. In the DVP system according to the present disclosure video production servers can be integrated on an as needed basis. This makes the DVP system much more flexible than conventional broadcast studios which need to be dimensioned for the most extensive and complicated production. Obviously, a lot of equipment in such a conventional broadcast studio stands idle when only simple programs are produced.

The present disclosure mainly refers to a broadcast studio. However, the present disclosure is likewise applicable TV production rooms, TV production cars or any other live TV production environment.

Figure 2:
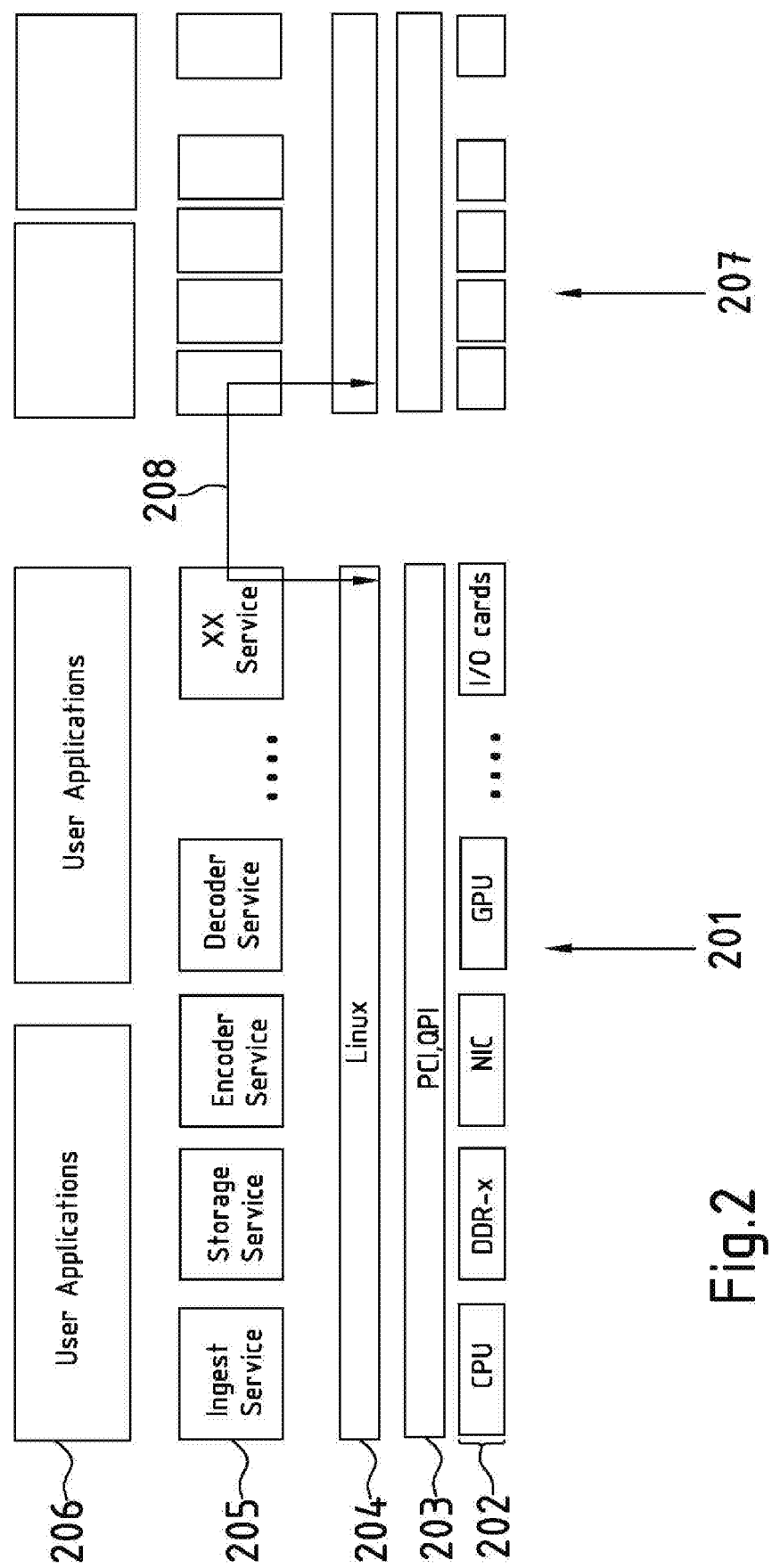
FIG. 2 the architecture of a video production server according to the present disclosure.

FIG. 2 exhibits the architecture of the video production server according to the present disclosure. The server as a whole is referenced with reference sign 201. As shown in FIG. 2 the architecture is organized in layers. The lowest layer in FIG. 2 is a hardware layer 202. For the sake of illustration some hardware components are shown, such as a central processing unit (CPU), a digital disk recorder (DDR), a network interface card (NIC), a graphical processing unit (GPU), and input/output (I/O) cards. As indicated by dots on the hardware layer 202, there may be other, more or fewer hardware components in other embodiments. All hardware components share the same clock.

A bus 203, e.g. a PCI or QPI bus, connects the hardware components with each other. An operating system 204 controls the operation of the hardware. The operation system may be a Linux-based system. The video production server 201 described so far hosts on a service layer 205 software modules comprising program code which is executable by the CPU of the server 201. Each software module is designed to provide for one particular so-called elementary service. The elementary services are built from threads. Threads are the smallest units that are eligible for mapping on the hardware. For instance, the elementary service of ingesting an ST2022-5/6/7 format stream includes three threads, namely i) receiving the ST2022-5/6/7 UDP packets, ii) decoding the ST2022-5/6/7 flow of packets into images, and iii) copying the images into a working memory. The data stream encoded according to the ST2022-5/6/7 format is just an example. The described concept applies likewise to other standards as well, for instance to AES67 and RFC4175.

A single image is also referred to as grain, wherein "grain" is a general term for the smallest element processed in the video production server 201. A grain may also represent a video or an audio frame.

In the description of embodiments reference is made to processing video signals most of the times. However, it is to be understood that in the context of the present patent application the processing of the video signal also implies a corresponding processing of an accompanying audio signal and associated meta-data, if applicable. Only for the sake of better intelligibility of the description of the present solution audio signals and meta-data are not always mentioned together with the video signals.

FIG. 2 exhibits four different kinds of elementary services on the service layer 205, namely ingest service, storage service, encoder service, and decoder service. Again, FIG. 2 indicates graphically that the video production server 201 may host further services as well. On an application layer 206 several elementary services are combined to obtain a functionality that is needed for a broadcast production.

One exemplary application of the video production server 201 shall be illustrated with reference back to FIG. 1. In the local studio 101 an interview is recorded. A video production server (not shown in FIG. 1) ingests the uncompressed audio and video streams from the cameras and microphones in the studio, encodes them and plays out the data via the network 102 to the video server 103, where the interview data can be recalled for a news broadcast later in the day. Hence, the video production server in the local studio uses the elementary services ingest, encode, and play out.

The architecture of the video production server 201 makes a complete abstraction from the underlying hardware. In different embodiments of the video production server the hardware can be a single machine, multiple machines, as well as a distributed and networked environment. Likewise, the software architecture of the video production server 201 has a modular composition. The elementary services of the video production server 201 can be recombined to create new instances and new functional entities. For example, the instances can be intermediate results in a complex production, such as an edited stream which is to be inserted in yet another stream for the final broadcast program. In another embodiment a first elementary service ingests uncompressed raw signals from acquisition devices, such as cameras and microphones, for being encoded into a lower bit rate signal by the next elementary service. This signal is stored in a data storage by the next elementary service for later use. The following elementary services read out the data and decode the signal into the original raw signal before it is finally transcoded by the last elementary service.

Though the architecture of the video production server 201 is not limited to a specific kind of hardware, it goes without saying that whatever kind of hardware is chosen it must have sufficient performance to execute the processing which is necessary to realize the elementary services and functionalities.

From the description of FIG. 2 it becomes apparent that the video production server permits to separate five basic functions in the broadcast production, namely, acquisition, storage, computation, play out and control. The acquisition of video and/or audio signals is performed by acquisition devices outside of and separate from the video production server. The basic function "control" refers to the operation of the video production server by means of the control panel or control application. Only the computation is executed inside the video production server or inside a cluster of multiple video production servers sharing the computation tasks. On the hardware level these basic functions are separated while the hardware components communicate by network connections such as an IP network.

In FIG. 2 a second server 207 is indicated. The communication between server 201 and server 207 is established on the level of the corresponding service layers 205 of servers 201 and 207, respectively, by a network connection 208. The network connection 208 may be a local area network connection as well as a wide area connection depending on the architecture of the DVP system as a whole.

It is noted that the input and output of the video production server 201 are synchronized with the other hardware components within a specific DVP system. The hardware modules of the video production server are synchronized with other devices in the digital video production system, e.g. by means of the PTP protocol to ensure synchronization of the hardware modules over the IP network. However, the execution of the elementary services within the video production server 201 is performed in an asynchronous manner.

The video production server is a set of software components that runs on COTS (Customer Off The Shelf) hardware. Each of its functionalities is achieved by using a specific piece of software that is assembled from reusable functional software blocks and that can run on any compatible hardware platform. New functionalities can be provided quickly by composing existing functional software blocks.

Relying on software exclusively brings unprecedented flexibility:

Hardware components are fully abstracted and become a commodity that can be repurposed and reconfigured depending on the functional need of the moment.

The hardware platform becomes dynamically scalable as software can be deployed on any particular machine, preventing having to overprovision hardware.

Dimensioning can be tight, as all the available processing power can be used at any time.

The hardware platform can be virtualized and can be implemented in a cloud.

All inter-equipment communication of commands and signals is achieved through IP links, which brings on the one hand flexibility and scalability to the routing of any kind of signals including baseband signals and compressed signals. On the other hand the inter-equipment communication becomes asynchronous. Synchronous communication is maintained only at the boundaries of the system, to ensure interoperability with conventional equipment. Asynchronous processing leads to more flexible dimensioning, as it enables statistical, instead of worst-case, dimensioning of input/output interfaces and computing power.

Figure 3:
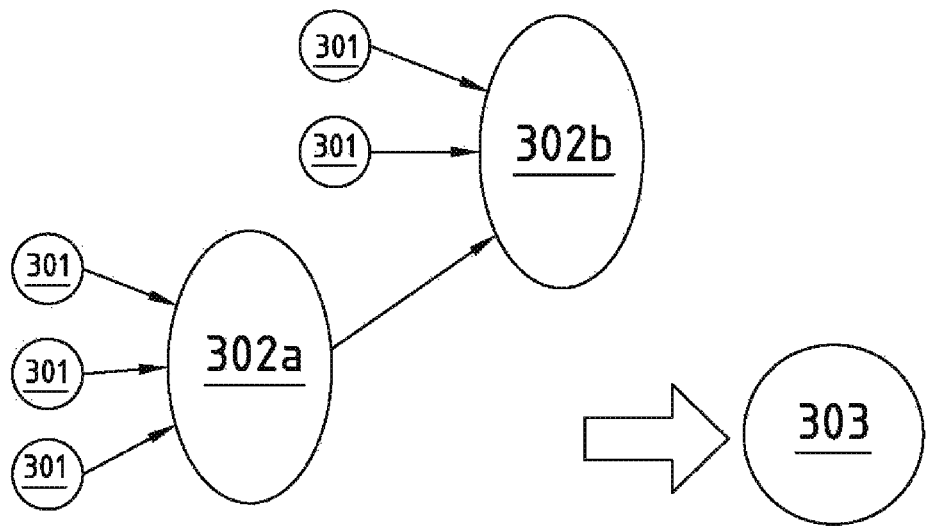
FIG. 3 a visualization of the conceptual relationship between feeds, elementary services, and functionalities.

FIG. 3 visualizes in a simple graphic the architecture of the hierarchical software. The small circles 301 represent input streams or feeds, such as raw signals from acquisition devices that require resources for ingesting, compressing etc. in form of the already mentioned elementary services, which are shown in FIG. 3 as ellipses 302a and 302b. This concept can be cascaded such that the output of elementary service 302a becomes the input of elementary service 302b. The sequence of elementary services results in a functionality or functional service 303. The functional service 303 can be designed flexibly by modifying the type and/or number of the underlying elementary services to correspond to the needs of the producer.

Figure 4:
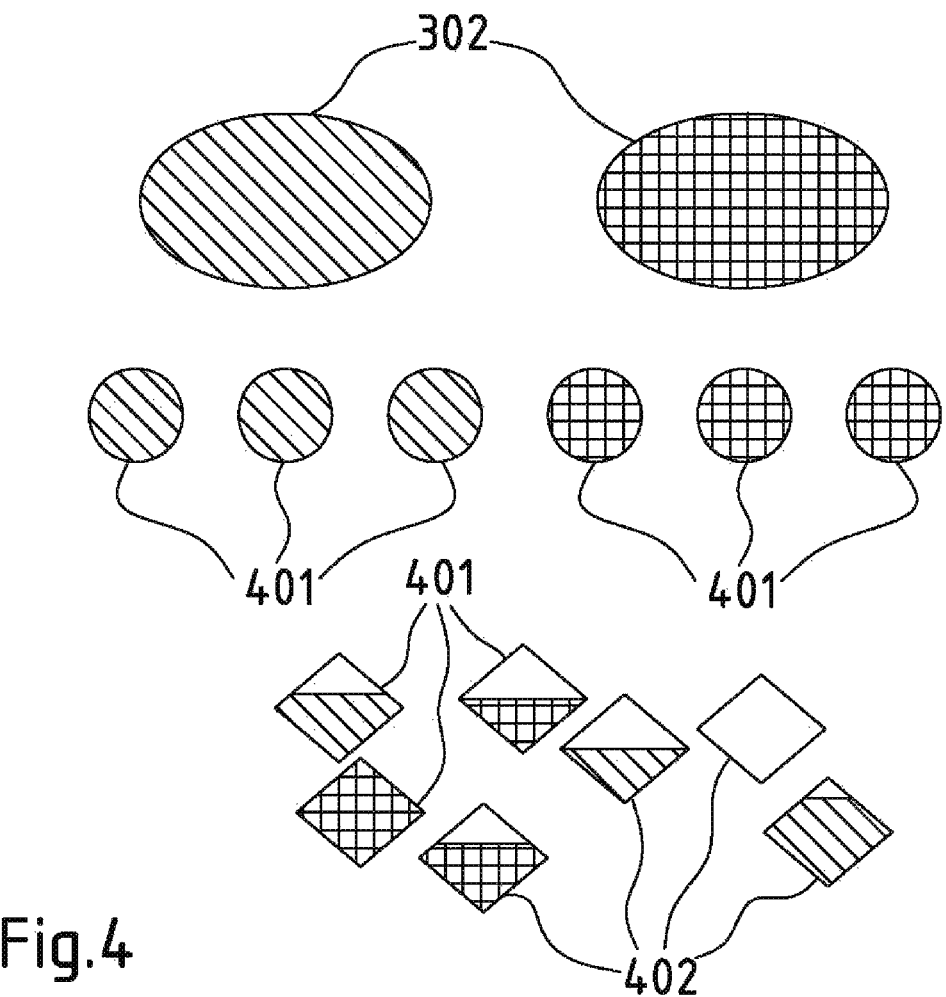
FIG. 4 the mapping of elementary services on a hardware platform.

FIG. 4 symbolizes by different graphical elements the abstraction of the software architecture from the underlying hardware. As mentioned before, the software modules realizing elementary services can run on any hardware provided its performance is sufficient to execute the software modules with the required quality of service, i.e. provide for sufficient processing power, storage, and connectivity. The elementary services 302 are composed of threads 401 having a pattern in FIG. 4 that corresponds to the pattern of the associated elementary services 302 and associated hardware nodes 402. Blank portions of the hardware node symbols indicate that the capacity of the corresponding hardware node is not fully used. The lower part of FIG. 4 shows how specific hardware nodes 402 representing processors, memories, and input/output interfaces form a hardware platform. The elementary services 302 are mapped onto the hardware nodes 402. The same software instance can be mapped on multiple hardware topologies. This mapping is performed, for example, by an algorithm assigning the needed computing, storage, and connectivity resources to the hardware resources, which are available on a specific hardware platform. The mapping algorithm enables mapping elementary services on different hardware topologies. Hence, the software architecture is completely detached from the hardware topology. Consequently, the hardware platform can be a single video production server or a cluster of multiple video production servers.

In general terms, a specific functionality or functional service offered by the proposed video production server is designed as a pipeline. At the entry of the pipeline the video production server ingests a stream generated by an acquisition device. At the end of the pipeline a stream is played out. In between elementary services are applied upon the stream to provide for the desired functionality.

Figure 5A:
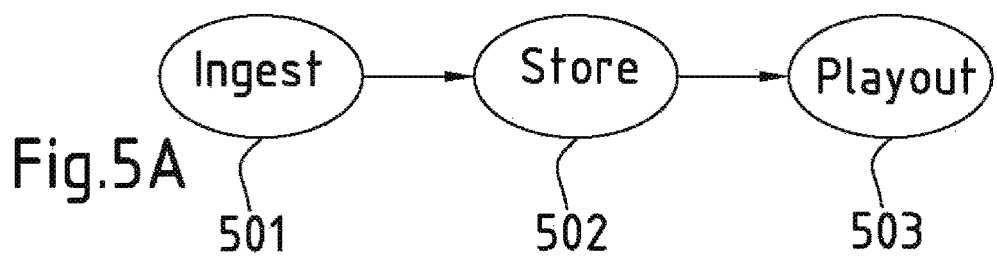
FIG. 5A a first pipeline of elementary services for a live production.
Figure 5B:
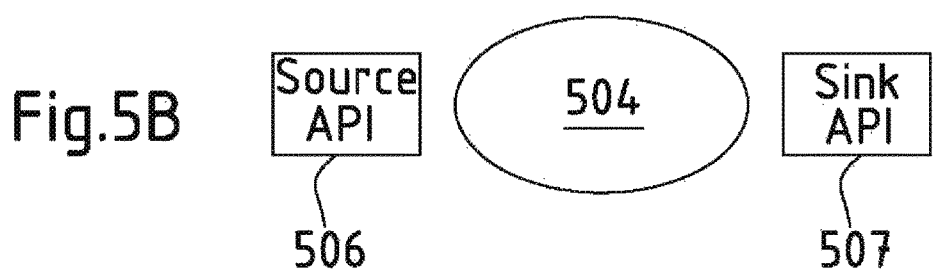
FIGS. 5B and 5C a schematic illustration of elementary services and corresponding APIs.

FIG. 5A shows one example of such a pipeline that includes the elementary services "ingest" 501, "store" 502, and "playout" 503. Between the different elementary services application programming interfaces (API) are defined (FIG. 5B). The APIs prescribe a unitary data format for the video, audio and/or meta-data at the input and output of the software modules, enabling a user defined sequence of elementary services. The APIs further include a unitary format for control data for controlling the elementary services and the video production server as a whole. These APIs are fundamental because they enable together with the pipeline mechanism the flexibility of the video production server according to the present disclosure.

In an embodiment of the proposed video production server, which is adapted for live broadcast productions, the pipeline mechanism needs some optimization. In live broadcast productions very large amounts of data have to be transferred and processed. An HD video stream consists of 24 to 60 images per second and each HD image consists of up to 1920×1080 pixels. This leads to a data rate of 50 to 440 Mbps for a compressed video stream in production and up to 3 Gbps if the video stream is uncompressed. Ultrahigh definition (UHD), high dynamic range (HDR) and high frame rate (HFR) video signals lead to even higher data rates. Therefore, it is necessary to properly manage the load on the hardware platform and to not introduce overhead in the pipeline by unnecessary copies of video images. This is achieved by implementing a source/sink mechanism between each elementary service. The source/sink mechanism is instantiated in the course of the mapping of each elementary service on a given hardware platform. In case the mapping is done on a single machine a protected shared memory mechanism is used. In case the mapping is done on a cluster of multiple video production servers, an Internet protocol (IP) based communication is used. For trusted and short distance communication the TCP protocol can be used, while for longer distance communication an enhanced UDP protocol is preferred.

Figure 5C:
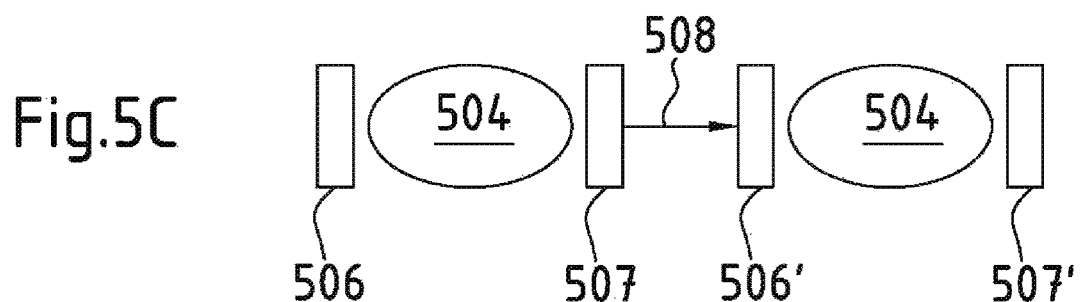

FIG. 5B illustrates the relation and interplay of APIs and elementary services. Each elementary service 504 has at its input a source API 506 and at its output a sink API 507. The source and sink APIs 506, 507 abstract the elementary service 504 enabling concatenation of elementary services as it is shown in FIG. 5C. In FIG. 5C arrow 508 symbolizes the data flow from elementary service 504 to elementary service 504' via the sink API 507 and the source API 506'.

Figure 5D:
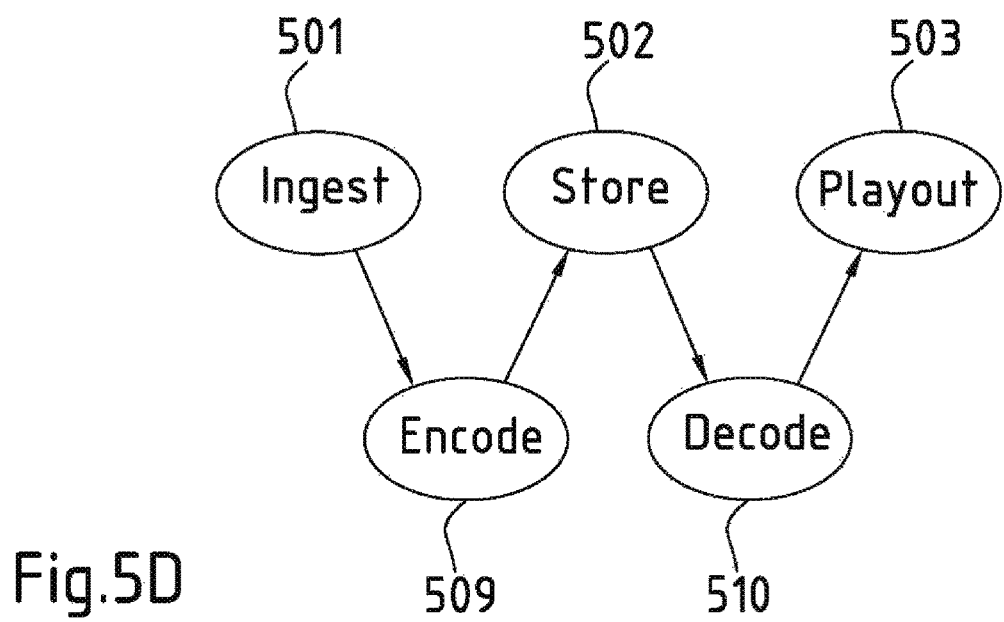
FIG. 5D a second pipeline of elementary services for a live production.

The APIs allow intercession, i.e. further elementary services are executable between elementary services of an existing pipeline. This is illustrated in FIG. 5D. FIG. 5D still contains the pipeline of the first example shown in FIG. 5A. However, there are additional elementary services "encode" 509 and "decode" 510 placed between the originally existing elementary services 501 to 503. The additional elementary services 509, 510 are only exemplary. Any other elementary service could be inserted as well because the APIs allow any combination of elementary services yielding the specific functionality required by the producer.

Figure 6:
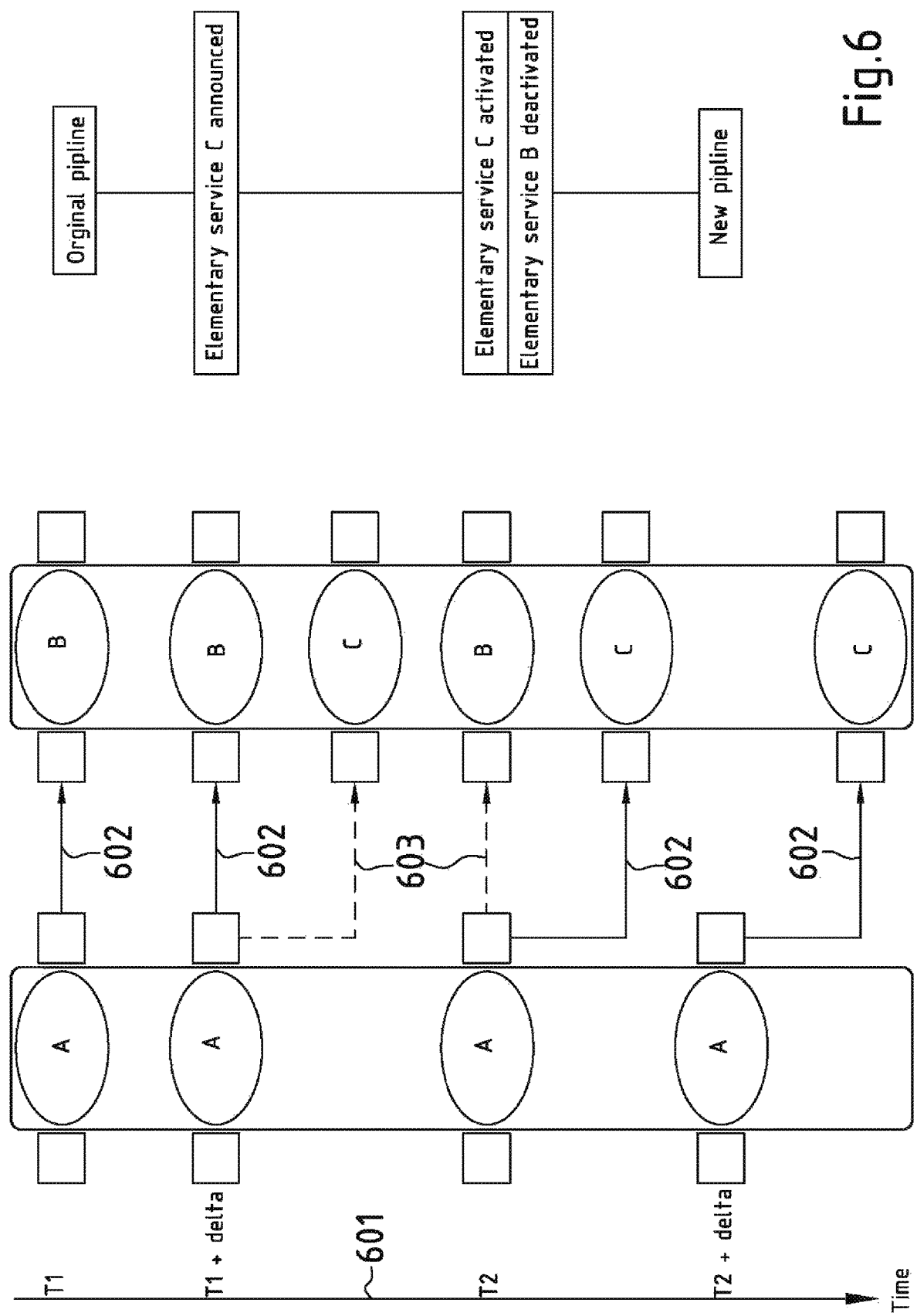
FIG. 6 a pipeline reconfiguration mechanism.

FIG. 6 exhibits a scheme to illustrate the mechanism of pipeline reconfiguration. On the left-hand side of FIG. 6 the time line 601 is shown on which time increases from top to bottom in FIG. 6. At point in time T1 the original pipeline exists in which signals flow from elementary service A to elementary service B. At point in time T1+delta a new elementary service C is announced and then activated at point in time T2 while at the same time elementary service B is deactivated. At point in time T2+delta the new pipeline with signal flow from elementary service A to elementary service C is settled. The active signal flow from left to right in FIG. 6 is shown with solid arrows 602 while a potential signal flow to an announced or still announced elementary service is shown with dashed arrows 603. On the right-hand side FIG. 6 also shows a flow diagram displaying the steps that lead from the original pipeline setting to the new pipeline setting.

Even more, the APIs allow for that the pipeline can be changed per grain. This flexibility leads to interesting applications, since it is possible to handle very different production needs with a single system without needing any reconfiguration overhead. A typical example is the back to back play out in news applications.

News applications need to combine many different video sources. These different video sources have different properties, e.g. streams from different sources have different encodings and, thus, require different decoders. That means that the pipeline contains different decoders for the different video sources.

The proposed video production server with its pipeline approach of sequenced elementary services with defined APIs in between permits that a different decoder is used per grain. The APIs and pipeline are untouched while only the internal processing of the elementary services changes.

The pipeline and the APIs permit that the internal processing of an elementary service is modified without impact on the pipeline. This offers the possibility of e.g. changing the format of the video (resolution, color matrix, . . . ) or the protocol of the video (ST2022-5/6/7, RFC4175, . . . ) without modifying the rest of the pipeline. This enables rapid product evolutions of the video production server as well as extreme versatility and grain-wise reconfiguration of the pipeline.

Technically this boils down to the replacement or modification of threads that compose the elementary service. But, regardless of these modifications, the relations between the elementary services remain untouched such that the pipeline itself is not altered.

For illustrative purposes a simple video production server instance that stores video and/or audio streams to a storage is considered. A first ingest service ingests 1080i streams according to the ST2022-5/6/7 protocol. This requires a simple setup with an ingest elementary service and a store service. If instead an audio stream is to be stored, then only the internal processing of the ingest elementary service has to be modified to ingest e.g. AES67 audio. Similarly, the ingest service is adaptable to other video and audio formats. Finally, it is noted that the ingest module is capable of ingesting simultaneously multiple feeds of different contents, e.g. audio, video and meta-data, and different formats including different encodings. The feeds are receivable of different technical interfaces, such as IP multicast, SDI, ASI, IP TCP unicast, etc. The acquisition devices from which the feeds are received do not have to be in the same time domain.

The video production server is based on a unique synchronization mechanism. Rather than relying on synchronization by the execution pipeline itself, as is the case in hardware oriented implementations, the present video production server is internally intrinsically asynchronous. The synchronicity between different devices in a broadcast studio, that is critical in broadcast applications, is obtained by assigning time stamps to the grains. The ingest module of the video production server assigns a time stamp to each packet or "grain". The time stamps are based on information within the data stream. Alternatively, the timestamps are based on a unique clock which is made unique across several video production servers by means of the PTP timing protocol. The individual packets or grains are identified by the time stamp and time duration. The ingest module itself is synchronized with the acquisition devices. In this way the video production server enables real-time processing in a live production.

Each "grain" is processed, such as encoding, storing etc. within the video production server in an independent manner while preserving the processing order. This implies that the temporal relationship between different grains is not guaranteed inside the video production server.

When the video production server outputs the grains again, the correct sequence of the grains has to be reestablished. It is noted that the clock rate of the output system can be different from the clock rate of the ingest module, e.g. input image frames are received from a camera with a rate of 240 frames per second, while the output image frames are outputted at a rate of 50 Hz or 60 Hz.

Figure 7:
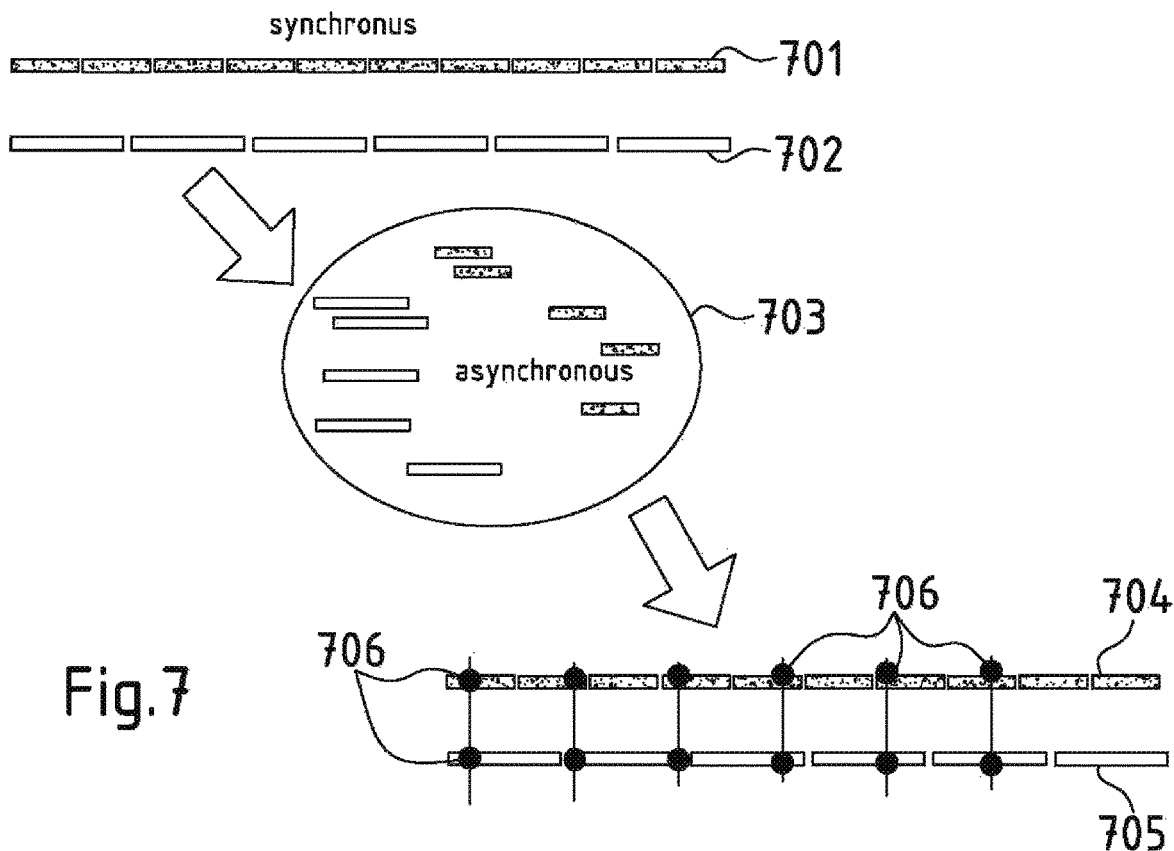
FIG. 7 an illustration of the synchronization principles of the video production server.

FIG. 7 illustrates the working principle of the video production server. In FIG. 7 two incoming serial streams 701, 702 are ingested by a video production server 703. The ingest module of the video production server is synchronized with the acquisition devices. The processing of the data frames inside the video production server 703 is performed in an asynchronous manner. The output module of the video production server is synchronized again with downstream processing devices and outputs two streams 704, 705. The synchronicity of the output frames of the streams 704, 705 is guaranteed by the clock of an output module requesting the corresponding grains: For each clock tick of the output module the system looks for the grain that matches with that tick, i.e. the grain for which the tick falls within the period [time stamp, time stamp plus duration]. The clock ticks of the output module are shown as circles 706. The clock ticks 706 occur simultaneously for both output streams 704 and 705.

For this reason it is important that the different hardware modules share the same clock while the software layers of the video production server architecture are abstracted from the underlying hardware. The PTP protocol is used to ensure synchronization of the hardware modules over IP networks. Given the currently used frame rates (one frame every 8 to 50 ms), the PTP protocol is sufficiently accurate.

The combination of the time stamp based synchronization of streams and the intercession capabilities of the video production server pipeline by means of unitary APIs allow for a novel system level failure resistance approach.

One application of the presented video production server is a so called referee application. The referee application enables displaying frames of images captured by different cameras from different perspectives. The displayed frames are taken in the same instant of time by the different cameras and put a referee in a position to properly assess a complicated situation in a ball game like basketball. There may also be other applications where browsing of multiple stored video streams is desirable.

Figure 8A:
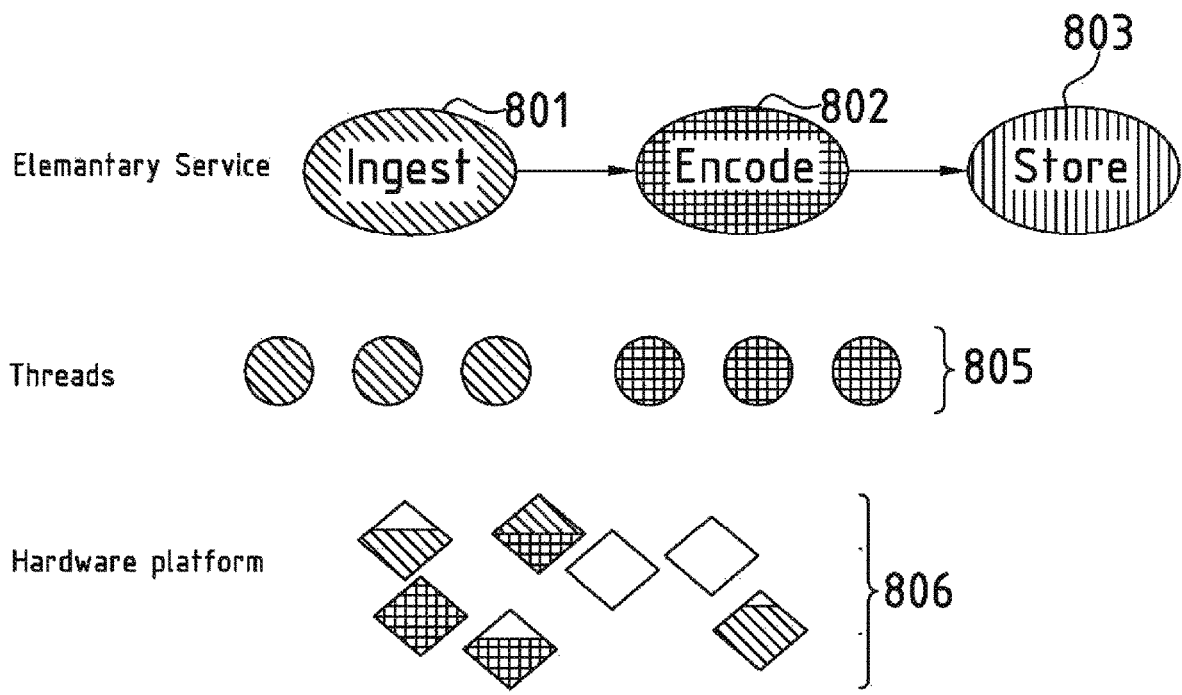
FIGS. 8A to 8C illustrations of a failsafe application on the video production server.
Figure 8B:
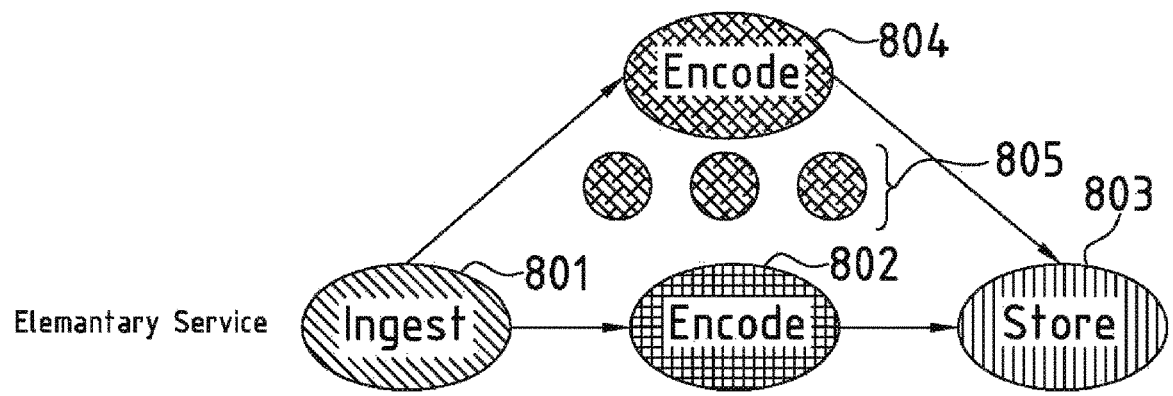
Figure 8B:
Figure 8C:
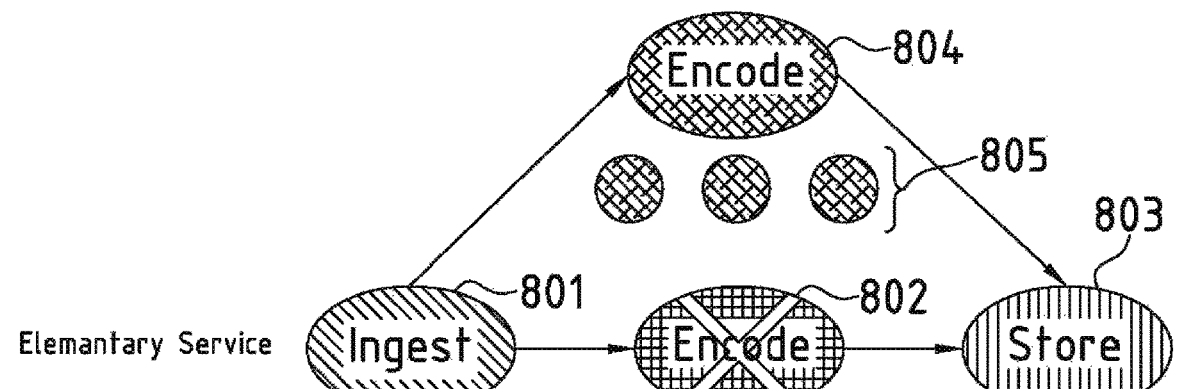
Figure 8C:

FIG. 8A illustrates the normal operation of the video production server. Elementary services 801-803 and threads 805 are mapped on a given hardware platform 806. FIG. 8B shows a different situation in which an additional encode elementary service 804 is introduced into the pipeline running concurrently to provide for hot failover capability in case some hardware supporting one of the two encode elementary services 802, 804 fails. This situation is shown in FIG. 8C, where the encode elementary service 802 has failed without affecting the processing flow along with the pipeline as a whole because in this situation all packets are routed via the encode elementary service 804 which remains operational.

The time stamped nature of the grains allows the next elementary service, namely the store service 803 to easily cope with possible latency differences between the two encode modules 802, 804 and only store one instance of a processed frame. In case of a failure of a hardware module, the system continues to be operational. Obviously, thanks to the grain-wise reconfiguration possibility of the pipeline, this approach can also be used in a warm standby configuration.

This failover approach needs significantly less redundant resources because it is based on system knowledge and on exploiting the properties of the video production server pipeline, rather than on replicating the complete setup by replicating all the underlying hardware.

The capability of dynamically changing the pipeline does not only provide for failsafe operation but also permits to dynamically reconfigure the same video production server hardware from being an ingest server to become a playout or storage server. These modifications can be done from one grain or data frame boundary to the next grain of a received data stream.

FIG. 9A exemplifies the fault tolerance in greater detail. Elementary service A 901 sends an identical grain Ti 902 to elementary service B1 903 and elementary service B2 904 at the same time. The grain Ti gets processed by both elementary services B1 and B2 903, 904, which send their output to the source API 506 of elementary service C 906. The source API 506 of elementary service C 906 drops the second grain Ti if the identical grain Ti has already been received. I.e. if the grain Ti processed by elementary service B2 904 arrives as a second grain Ti at the source API 506 it gets dropped. This configuration secures uninterrupted processing even if one of the elementary services B1, B2 903, 904 fails.

Figure 9B:
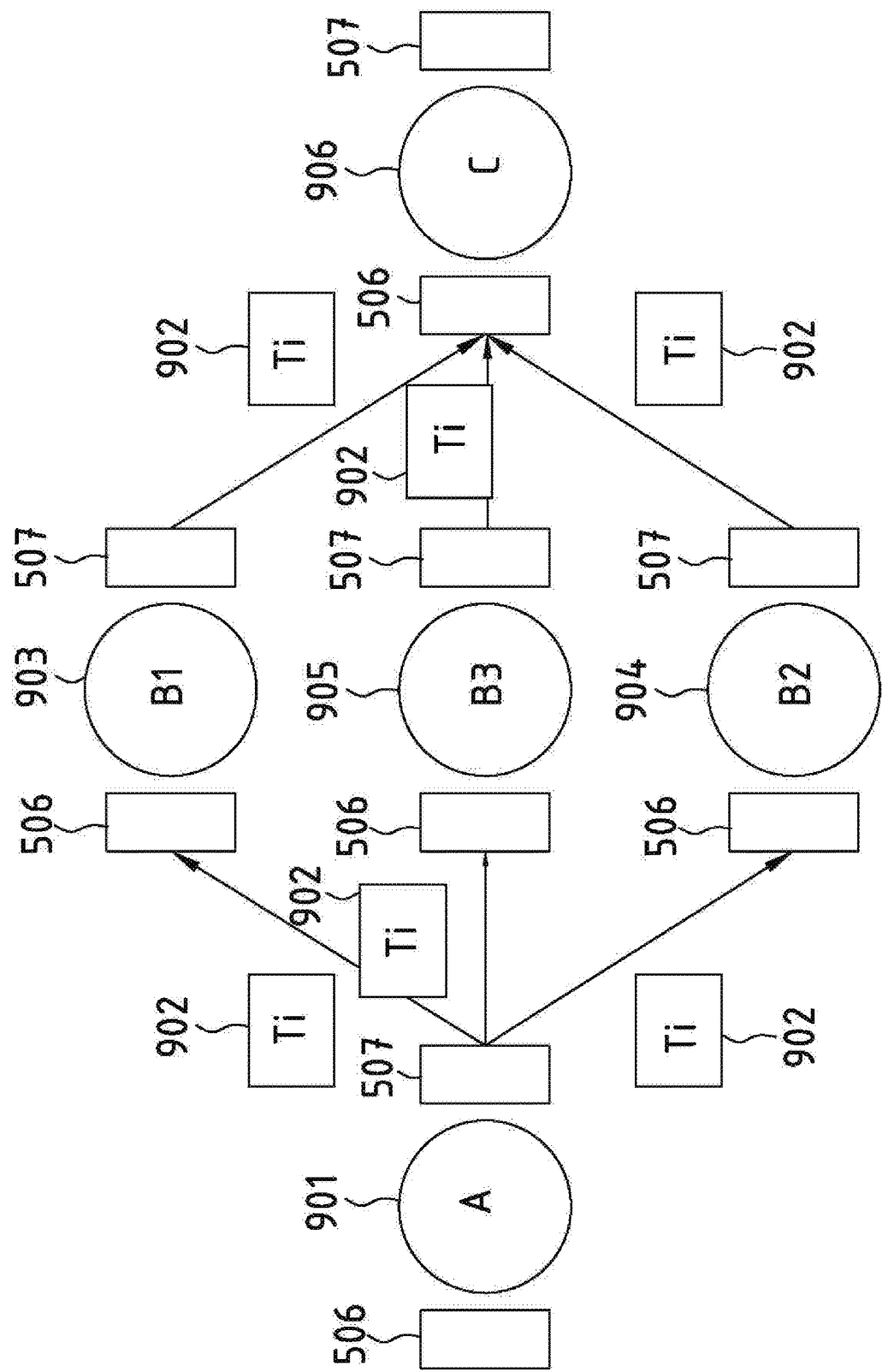

FIG. 9B shows a section of a further embodiment of a fault tolerant pipeline. In this embodiment elementary service A 901 sends the same grain Ti 902 to three elementary services B1, B2 and B3 903, 904 and 905 performing the same type of processing on grain Ti. The output of each elementary service B1, B2 and B3 903, 904 and 905 is transmitted to the source API 506 of elementary service C 906. If the entire hardware works properly then grain Ti is received three times at source API 506 of elementary service C 906. As a soon as two identical grains Ti are received at the source API 506 one of the identical grains Ti is forwarded to elementary service C 906 for being processed. If the source API 506 does not detect at least two identical grains Ti an error message is generated. This mechanism enables detecting failures in the hardware.

Finally, it is noted that the suggested video production server provides a scalable software storage component that brings instantaneous fine-grained IP-based access to grains as soon as they are recorded.

Figure 10:
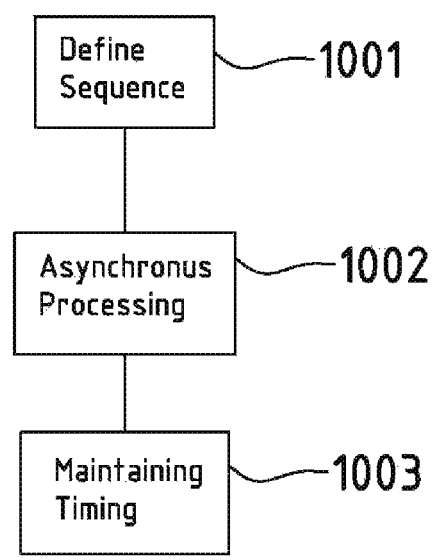
FIG. 10 a flow diagram of the operating method of the video production server.

FIG. 10 visualizes the concept of the operational method of the video production server. Initially, a sequence of elementary services is defined 1001 that is to be applied to frames of video and/or audio signals. Then the processing of video and/or audio signals according to the defined sequence of elementary services is performed in an asynchronous manner 1002. Finally, it is important to maintain 1003 the temporal relationship of time stamped frames of the associated video and/or audio streams. Associated video and audio streams pertain to the same application.

Figure 11:
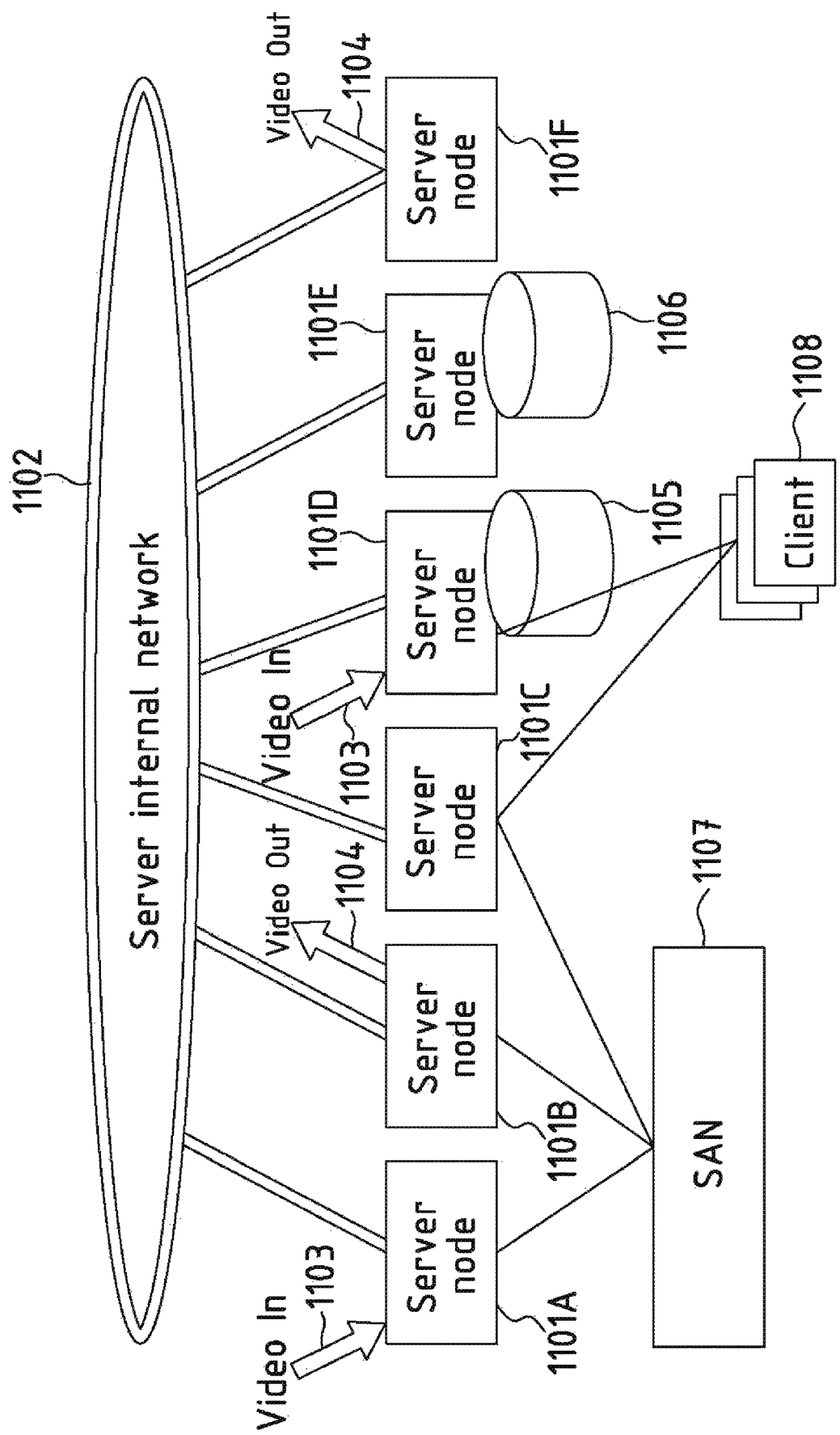
FIG. 11 a video production server composed of interconnected server nodes.

FIG. 11 gives an overview of a production set up involving a plurality of servers 1101A to 1101F. In FIG. 11 the individual servers are labeled as server nodes to emphasize that the server nodes 1101A to 1101F are individual standalone machines. The server nodes 1101A to 1101F are linked among each other via an internal network 1102 to form a server cluster performing processing tasks in a broadcast production. Since the elementary services are abstracted from the underlying hardware it is of no importance for the user if the processing for broadcast production is performed by an individual server node or by a server cluster comprising a plurality of servers nodes. The only difference for the user is that a cluster of server nodes provides a higher processing power which is scalable by adding additional server nodes to the cluster or removing them from the cluster.

The server nodes receive video data as input 1103 and provide processed video data as output 1104. The video data are communicated via the network 1102. The server nodes 1101D and 1101E are connected with local disk storages 1105 and 1106. Server nodes 1101A to 1101C are connected with a system area network (SAN) 1107 connecting the server cluster shown in FIG. 11 with other server clusters for exchanging video data, e.g. during a broadcast production. Server nodes 1101C and 1101D are connected with client devices 1108 for receiving input and/or providing output. One of the client devices 1108 may run an application controlling the server cluster.

Figure 12A:
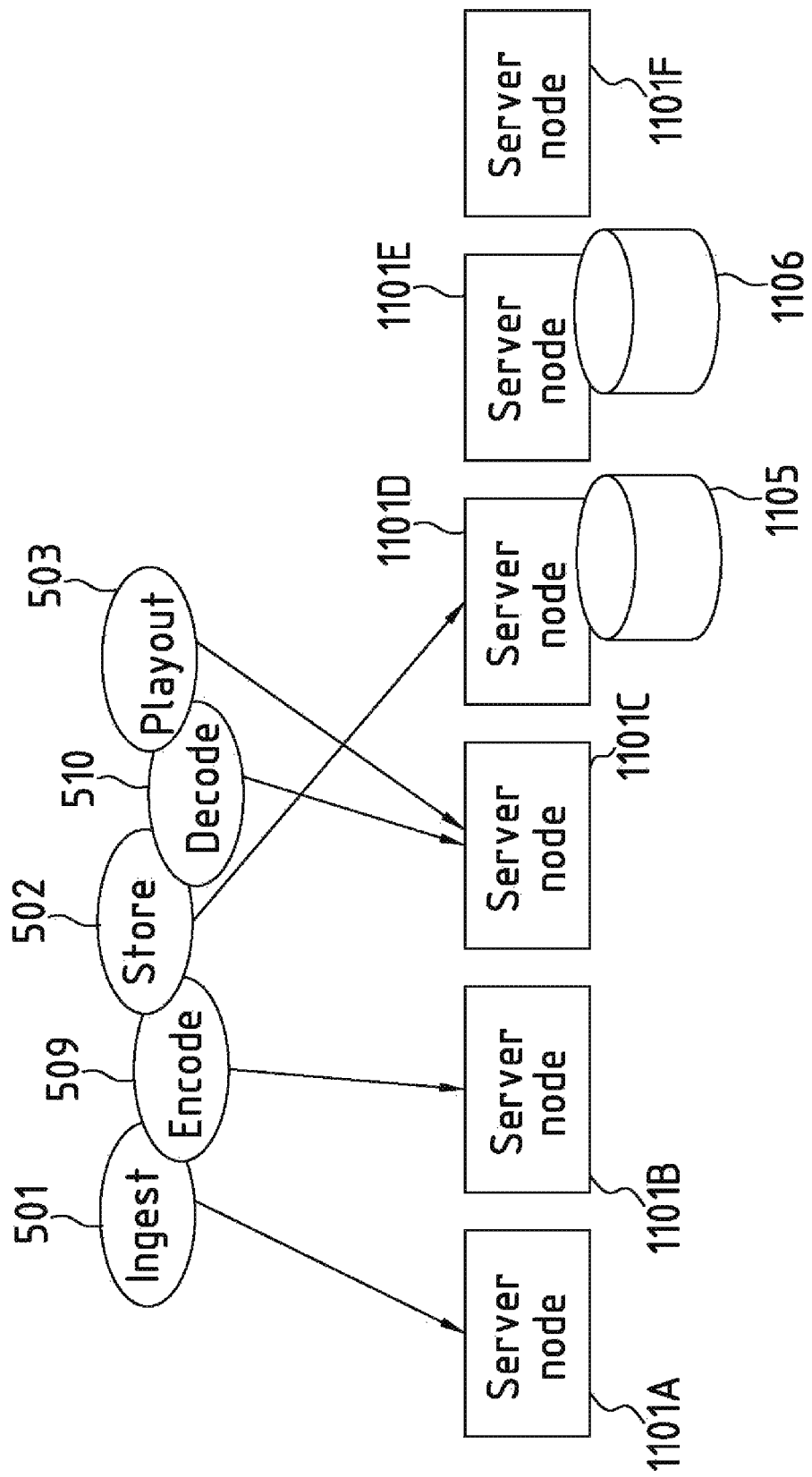
FIGS. 12A and 12B mapping of pipelines on the video production server of FIG. 11.

FIG. 12A displays a schematic illustration of one example how the pipeline already shown in FIG. 5D is mapped on a server cluster. The pipeline comprises elementary services 501, 502, 503, 509 and 510. The arrows in FIG. 12A indicate on which server node each one of the elementary services is mapped. In other embodiments the mapping could be different. In addition to that, in some embodiments the mapping is dynamically adapted to enhance the performance of the server cluster. If needed, the changes of the mapping occur from one data frame or grain of a signal stream to the next data frame. These swift changes are also relevant for the fault tolerance of the video production server.

Figure 12B:
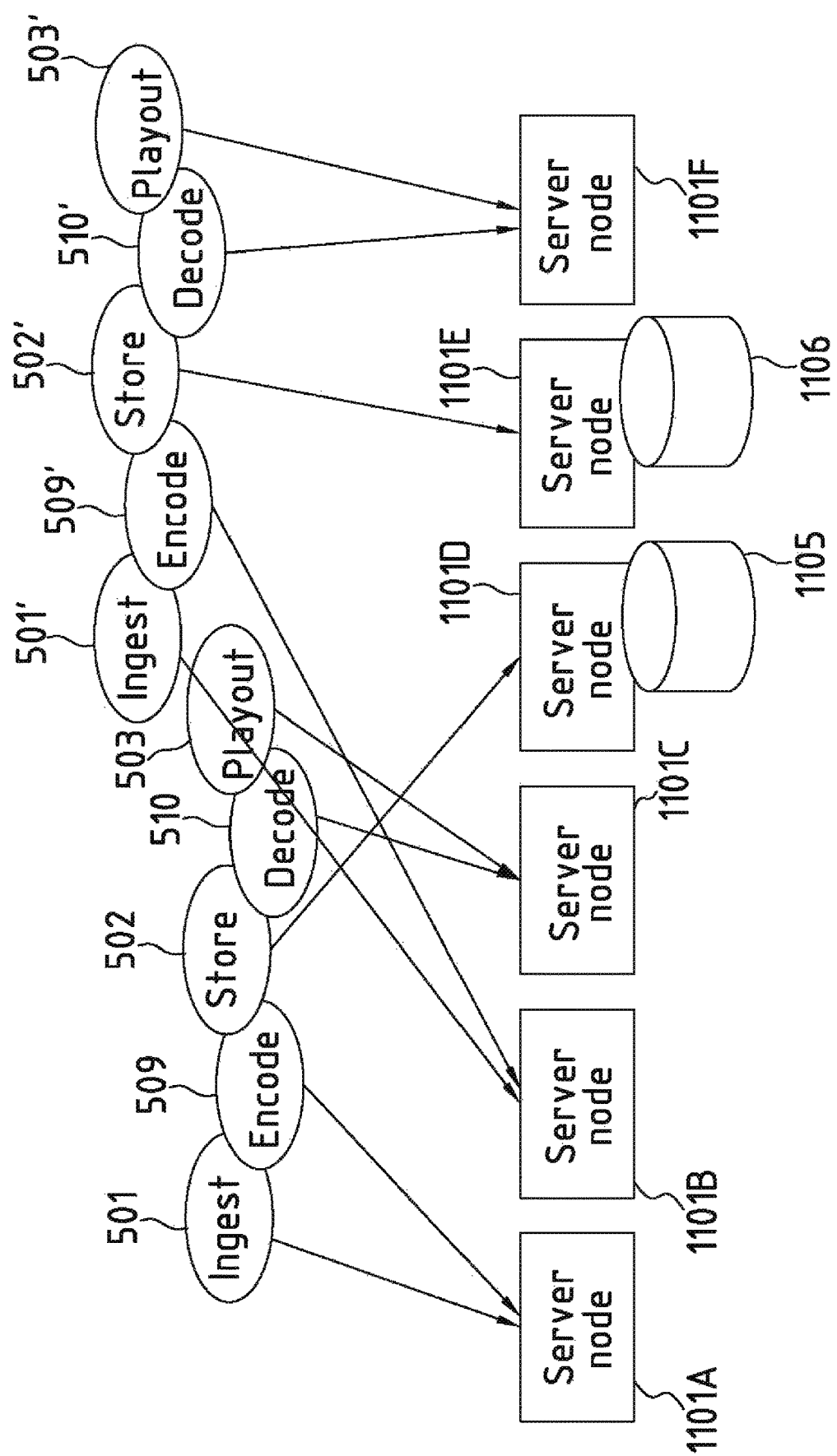

FIG. 12B shows an illustration of the mapping of two pipelines. The first pipeline comprises elementary services 501, 502, 503, 509 and 510. The second pipeline comprises elementary services 501', 502', 503', 509' and 510'.

In the examples shown in FIGS. 12A and 12B the pipelines of elementary services are mapped on a plurality of server nodes. However, it is noted that in an alternative approach each server node in the cluster executes all elementary services of a complete pipeline but only a fraction of all video signals. Both approaches have in common that the processing required for a specific broadcast production is shared among the server nodes in the cluster.

LIST OF REFERENCE SIGNS 101 local studio
102 network
103 video server
104 production server
201 video production server
202 hardware layer
203 bus layer
204 operating system layer
205 service layer
206 application layer
207 second video production server
208 network connection
301 feed
302 elementary service
303 functionality
401 feed, input stream
402 hardware nodes
501-504 elementary services
506 source API
507 sink API
508 data flow
509, 510 elementary services
601 timeline
602 actual signal flow
603 potential signal flow
701, 702 input streams
703 video production server
704, 705 output streams
706 clock ticks
801-804 elementary services
805 threads
806 hardware platform
901 elementary service
902 grain
903-906 elementary services
1001-1003 method steps
1101A-1101F server nodes
1102 internal server network
1103 video input
1104 video output
1105, 1106 disk storage
1107 system area network
1108 client

The invention claimed is:

1. A video production server comprising at least one processor and a storage, wherein software modules composed of executable program code are loaded into a working memory of the at least one processor, wherein each software module, when executed by the at least one processor, provides an elementary service; and wherein a concatenation of elementary services provides a functionality involving processing of video and/or audio signals needed for producing a broadcast program, wherein the execution of the elementary services within the video production server is performed in an asynchronous manner by the at least one processor, wherein the video production server is adapted to operate as an ingest server ingesting signals, including video and/or audio signals, received as streams of data frames from acquisition devices in synchronicity with the output of acquisition devices, wherein the video production server is equipped with an ingest module assigning time stamps to each incoming data frame, and wherein the video production server includes a storage enabling direct access to any data frame after the data frame has been stored, wherein the software modules are mapped on hardware of the video production server and wherein the video production server executes an algorithm which detects hardware failures and automatically re-maps the software modules such that the software modules are no longer mapped on the failed hardware.

2. The video production server according to claim 1, wherein the ingest server is adapted for ingesting simultaneously multiple signal streams of different formats.

3. The video production server according to claim 1, wherein the at least one processor is configured to process the data frames in the sequence of their time stamps assigned by the ingest module.

4. The video production server according to claim 1, wherein each software module of the video production server has defined data interfaces prescribing a unitary data format for video, audio, meta-data and/or control data at the input and the output of the software modules enabling a user defined sequence of elementary services.

5. The video production server according to claim 4, wherein the user defined sequence of elementary services forms at least one processing pipeline for video and/or audio signals and/or meta-data.

6. The video production server according to claim 5, wherein an elementary service can be removed from, replaced in or inserted into the at least one processing pipeline without affecting the operation of the remainder of the processing pipeline.

7. The video production server according to claim 1, wherein the video production server includes a storage enabling direct access to any grain after the grain has been stored.

8. The video production server according to claim 1 comprising multiple server nodes being communicatively connected by a network.

9. The video production server according to claim 8, wherein the software modules are dynamically mapped on the multiple server nodes for performance enhancement of the at least one processing pipeline composed of elementary services provided by the software modules.

10. The video production server according to claim 1, wherein each software module of the video production server has defined data interfaces prescribing a unitary data format for video, audio, meta-data and/or control data at the input and the output of the software modules enabling a user defined sequence of elementary services.

11. A distributed video production system comprising at least two broadcast production devices, which are interconnected by a network and which are synchronized with each other, wherein at least one of one of the broadcast production devices is the video production server according to claim 1.

12. A method for operating a video production server comprising at least one processor and a storage, wherein the method comprises:
    loading software modules composed of executable program code into a working memory of the at least one processor, wherein each software module, when executed by the at least one processor, provides an elementary service;
    defining a concatenation of elementary services providing a functionality involving processing of video and/or audio signals needed for producing a broadcast program;
    operating the video production server as an ingest server ingesting signals, including video and/or audio signals, received as streams of data frames from acquisition devices in synchronicity with the output of acquisition devices;
    assigning time stamps to each data frame of the received signal streams;
    executing the elementary services within the video production server in an asynchronous manner by the at least one processor,
    enabling direct access to any data frame after the data frame has been stored in the storage;
    mapping the software modules on hardware of the video production server; and
    executing an algorithm which detects hardware failures in the video production server and automatically re-maps the software modules such that the software modules are no longer mapped on the failed hardware.

13. The method according to claim 12, wherein the method further comprises:
    dynamically changing the sequence of elementary services from one data frame to the next data frame of a received signal stream by removing an elementary service from, replacing an elementary service in or inserting an elementary service into the sequence of elementary services.

14. The method according to claim 12, wherein the method further comprises:
    dynamically mapping the software modules on a hardware platform composed of multiple server nodes for performance enhancement of the sequence of elementary services.

15. The method according to claim 14, wherein the dynamical mapping changes from one data frame to the next data frame of a received signal stream.

16. A computer program product comprising computer program code stored on a non-transitory computing storage medium, which, when executed by a processor, performs the method according to claim 12.

17. The method according to claim 12, wherein the method further comprises:
    maintaining the temporal order of time stamped data frames and the synchronicity between associated streams such as a video stream and an associated audio stream.

18. Video production server comprising at least one processor and a storage, wherein software modules composed of executable program code are loaded into a working memory of the at least one processor, wherein each software module, when executed by the at least one processor, provides an elementary service; wherein a concatenation of elementary services provides a functionality involving processing of video and/or audio signals needed for producing a broadcast program, wherein the execution of the elementary services within the video production server is performed in an asynchronous manner by the at least one processor, wherein the video production server is adapted to operate as a play out server outputting time stamped video and/or audio signals as data frames in synchronicity with downstream devices receiving the output signals of the video production server, and wherein the video production server includes a storage enabling direct access to any data frame after the data frame has been stored, wherein the software modules are mapped on hardware of the video production server and that the video production server executes an algorithm which detects hardware failures and automatically re-maps the software modules such that the software modules are no longer mapped on the failed hardware.

19. The video production server according to claim 18, wherein the at least one processor is configured to process the data frames in the sequence of their time stamps assigned by the ingest module.

* * * * *